(12) United States Patent
Carroll

(10) Patent No.: US 11,151,500 B2
(45) Date of Patent: Oct. 19, 2021

(54) DIGITAL MODELING OF DISEASE ON CROPS ON AGRONOMIC FIELDS

(71) Applicant: The Climate Corporation, San Francisco, CA (US)

(72) Inventor: Patricia Ann Carroll, Seattle, WA (US)

(73) Assignee: The Climate Corporation, San Francisco, CA (US)

( * ) Notice: Subject to any disclaimer, the term of this patent is extended or adjusted under 35 U.S.C. 154(b) by 355 days.

(21) Appl. No.: 15/820,322

(22) Filed: Nov. 21, 2017

(65) Prior Publication Data

US 2019/0156255 A1 May 23, 2019

(51) Int. Cl.
*G06Q 10/06* (2012.01)
*G06Q 50/02* (2012.01)

(52) U.S. Cl.
CPC ....... *G06Q 10/0635* (2013.01); *G06Q 10/067* (2013.01); *G06Q 50/02* (2013.01)

(58) Field of Classification Search
CPC ... G06Q 10/0635; G06Q 10/067; G06Q 50/02
See application file for complete search history.

(56) References Cited

U.S. PATENT DOCUMENTS

| 6,937,939 | B1 * | 8/2005 | Shibusawa | G01N 21/314 250/255 |
| 9,563,852 | B1 | 2/2017 | Wiles et al. | |
| 2009/0112637 | A1 | 4/2009 | Avey et al. | |
| 2014/0136458 | A1 * | 5/2014 | Levin | G06Q 10/06312 706/21 |
| 2015/0126365 | A1 | 5/2015 | Sword | |

(Continued)

FOREIGN PATENT DOCUMENTS

WO   WO 2006/135880 A2   12/2006

OTHER PUBLICATIONS

Research and IPM; Models: Diseases; Oct. 21, 2014 (Year: 2014).*

(Continued)

*Primary Examiner* — Deirdre D Hatcher
(74) *Attorney, Agent, or Firm* — Hickman Becker Bingham Ledesma LLP

(57) ABSTRACT

A system and method for identifying a probability of disease affecting a crop based on data received over a network is described herein, and may be implemented using computers for providing improvements in plant pathology, plant pest control, agriculture, or agricultural management. In an embodiment, a server computer receives environmental risk data, crop data, and crop management data relating to one or more crops on a field. Agricultural intelligence computer system 130 computes one or more crop risk factors based, at least in part, the crop data, one or more environmental risk factors based, at least in part, the environmental data, and one or more crop management risk factors based, at least in part, on the crop management data. Using a digital model of disease probability, agricultural intelligence computer system 130 computes a probability of onset of a particular disease for the one or more crops on the field based, at least in part, on the one or more crop risk factors, the one or more environmental risk factors, and the one or more crop management factors.

14 Claims, 7 Drawing Sheets

(56) References Cited

U.S. PATENT DOCUMENTS

2016/0078570 A1* 3/2016 Ethington .......... G06Q 10/1097
                                                    705/7.21
2016/0148104 A1* 5/2016 Itzhaky ................ G06K 9/6272
                                                    706/12
2017/0349957 A1* 12/2017 Champagne ........... A01N 63/04
2018/0018414 A1* 1/2018 Biswas .................. G06F 17/11

OTHER PUBLICATIONS

The International Searching Authority, "Search Report" in application No. PCT/US2018/059880, dated Jan. 18, 2019, 9 pages.
Current Claims in application No. PCT/US2018/059880, dated Jan. 2019, 4 pages.
The International Bureau of WIPO, "International Preliminary Report on Patentability" in application No. PCT/US2018/059880, dated May 26, 2020, 6 pages.
Current Claims in application No. PCT/US2018/059880, dated May 2020, 4 pages.

* cited by examiner

Fig. 2
(a)
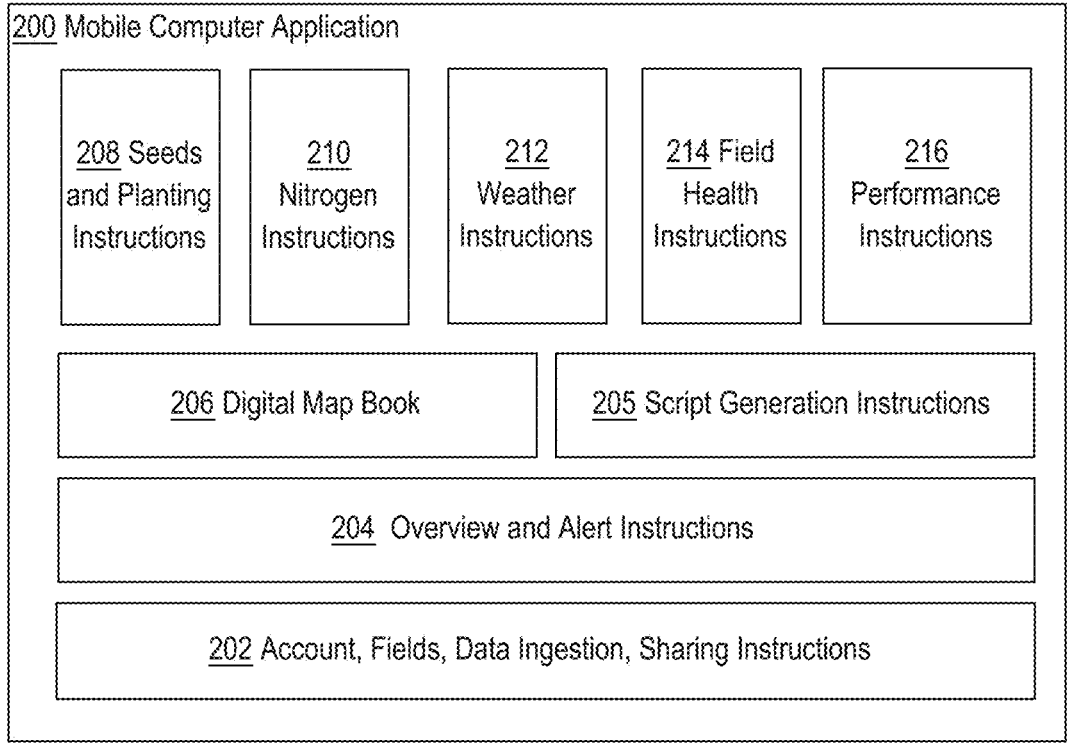
(b)
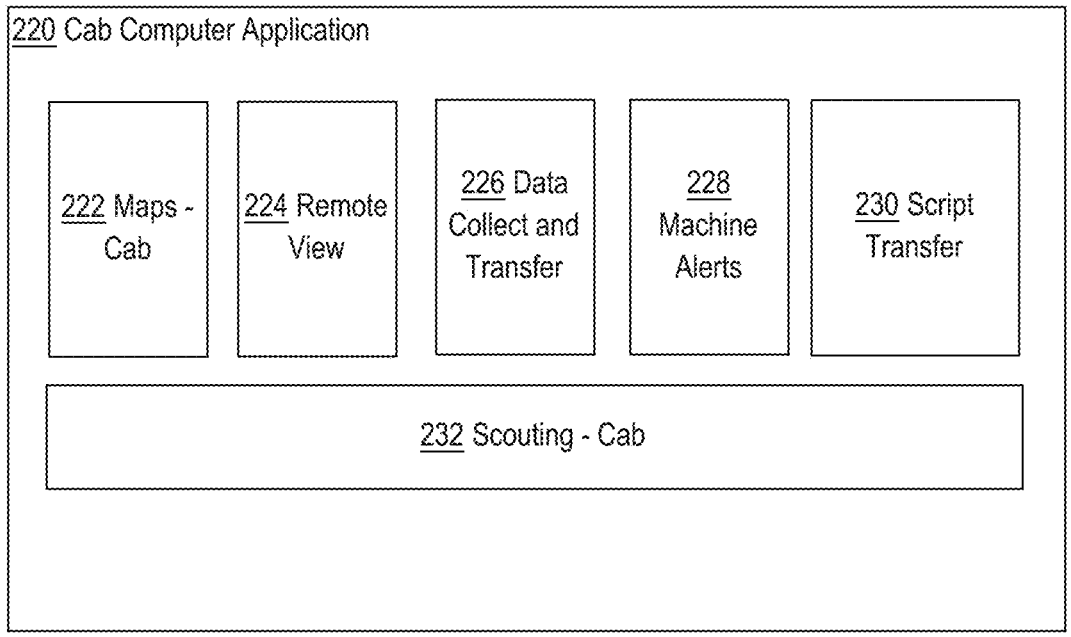

FIG. 6

DIGITAL MODELING OF DISEASE ON CROPS ON AGRONOMIC FIELDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2017 The Climate Corporation.

FIELD OF THE DISCLOSURE

The present disclosure relates to digital modeling of agronomic fields using a server computer, using programmed process to provide improvements in the technologies of plant pathology, plant pest control, agriculture, or agricultural management. Specifically, the present disclosure relates to modeling a likelihood of particular diseases presenting on a field based on field data and then using the resulting data models to improve plant pathology, plant pest control, agriculture, or agricultural management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Field managers are faced with a wide variety of decisions to make with respect to the management of agricultural fields. These decisions range from determining what crop to plant, which type of seed to plant for the crop, when to harvest a crop, whether to perform tillage, irrigation, application of pesticides, application of fungicides, and application of fertilizer, and what types of pesticides, fungicides, and fertilizers to apply.

Field managers must also contend with outside phenomena which affect the yield of their crops. For instance, certain diseases can have a large impact on the health of a crop and thus the amount the crop yields. Corn in particular is susceptible to diseases such as northern leaf blight and gray leaf blot.

In order to combat the effects of diseases on crops, a field manager may apply fungicide to a field. The fungicide reduces the risk of onset of diseases and, in some cases, can reduce the effects of diseases currently on the field. While applying fungicide is useful in preventing disease, it also comes at a cost. Applying fungicide to a field that is not in danger of being affected by disease can be a waste that costs a field manager some of the total revenue from sale of the crop.

Generally, a field manager has no good way of determining whether the field is currently being affected by disease or is about to be affected by a disease. A field manager maintaining hundreds of acres of crops may not have the capability to manually check each crop for signs of disease. Additionally, a field manager is unable to determine when, if ever, a disease may present itself on the crops.

Thus, there is a need for a system or method which tracks the likelihood of onset of a disease on a crop.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. DETERMINING RISK OF DISEASE
   3.1. RECEIVED DATA
   3.2. FACTOR GENERATION
   3.3. DIGITAL DISEASE MODELING
   3.4. DATA USAGE
4. BENEFITS OF CERTAIN EMBODIMENTS
5. EXTENSIONS AND ALTERNATIVES

1. General Overview

Systems and methods for tracking disease onset in one or more fields are described herein. In an embodiment, weather data is used to determine an environmental risk of disease presenting on the crop. Using the environmental risk, data relating to the crop such as the hybrid susceptibility and/or relative maturity, and data relating to the management of the field, such as tillage, harvesting, and/or product application, the server computer models a risk of the disease presenting on the crop over a particular timeframe. If the server computer determines that the disease has or will present on the crop, the server computer is able to make recommendations for preventing the disease and/or generate a script which is used to control an implement on the field, thereby causing the implement to spray the field with a fungicide or take other disease preventative measures.

In an embodiment, a method comprises receiving environmental risk data, crop data, and crop management data relating to one or more crops on a field; computing one or more crop risk factors based, at least in part, on the crop data; computing one or more environmental risk factors based, at least in part, on the environmental risk data; computing one or more crop management risk factors based, at least in part, on the crop management data; using a digital model of disease probability, computing a probability of onset of a particular disease for the one or more crops on the field based, at least in part, on the one or more crop risk factors, the one or more environmental risk factors, and the one or more crop management factors.

2. Example Agricultural Intelligence Computer System

2.1 Structural Overview

Figure 1:
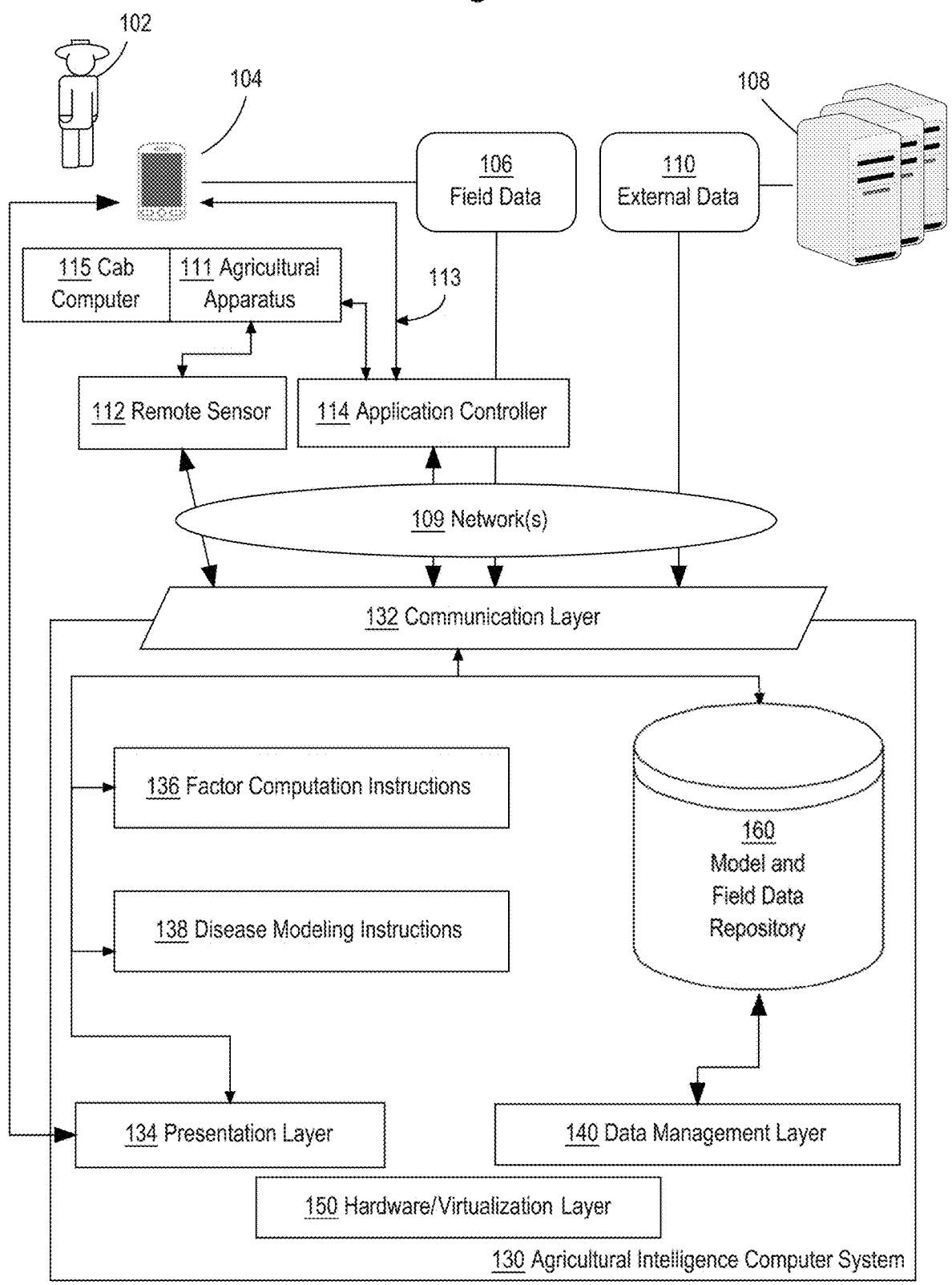
FIG. 1 illustrates an example computer system that is configured to perform the functions described herein, shown in a field environment with other apparatus with which the system may interoperate.

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
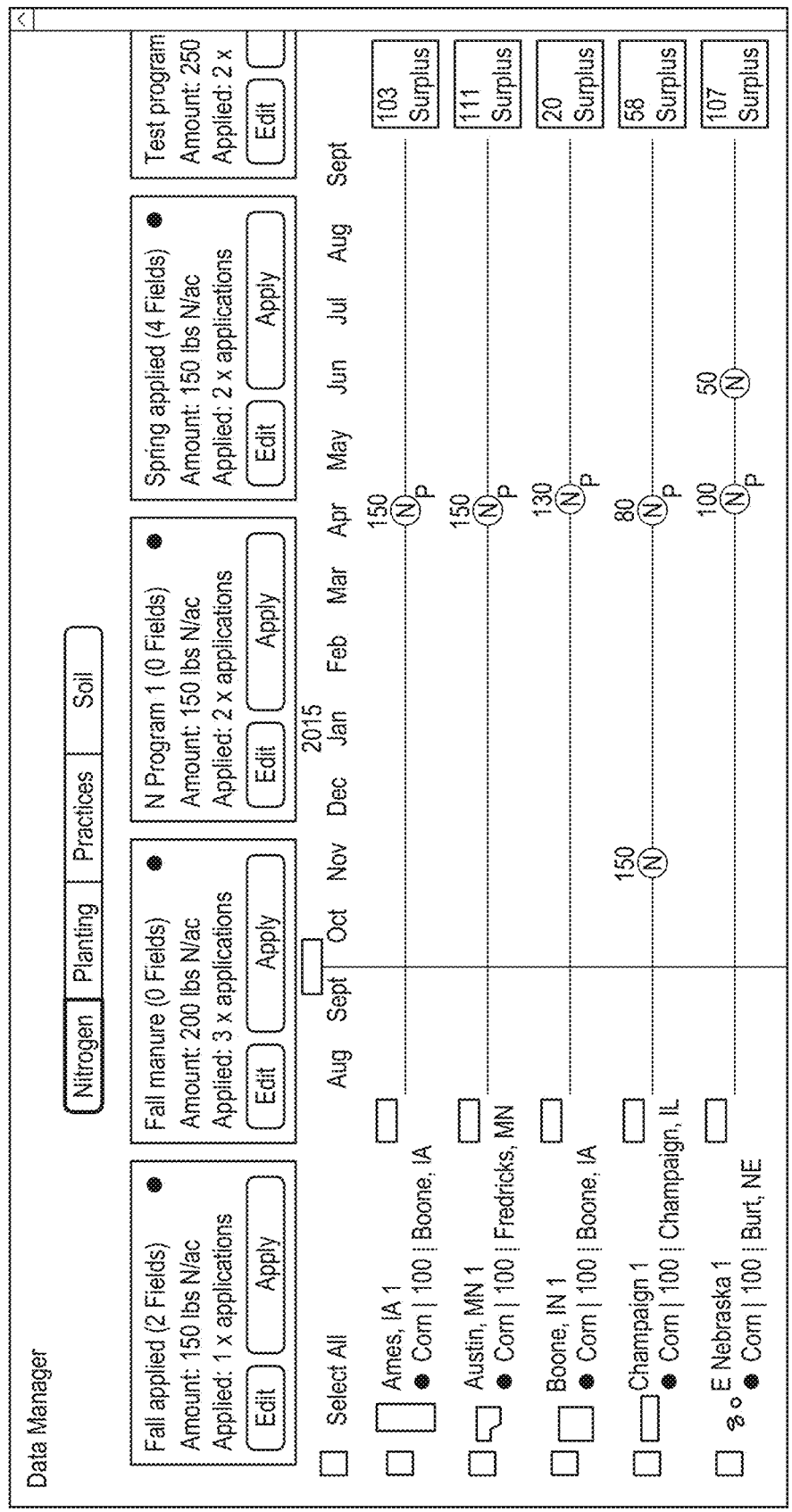
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

Figure 6:
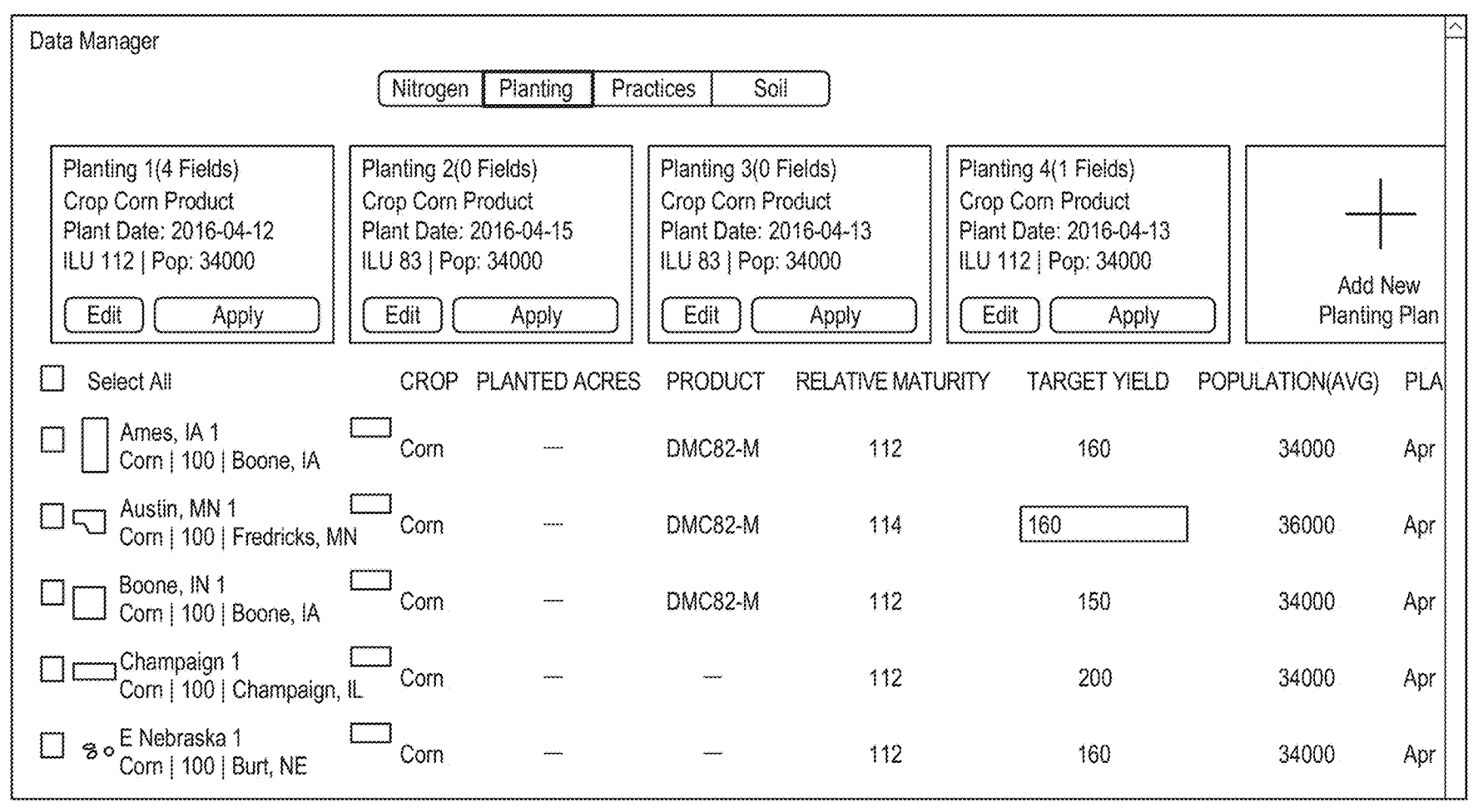

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of factor computation instructions 136 and disease modeling instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the factor computation instructions 136 may comprise a set of pages in RAM that contain instructions which when executed cause performing the factor computation functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of factor computation instructions 136 and disease modeling instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
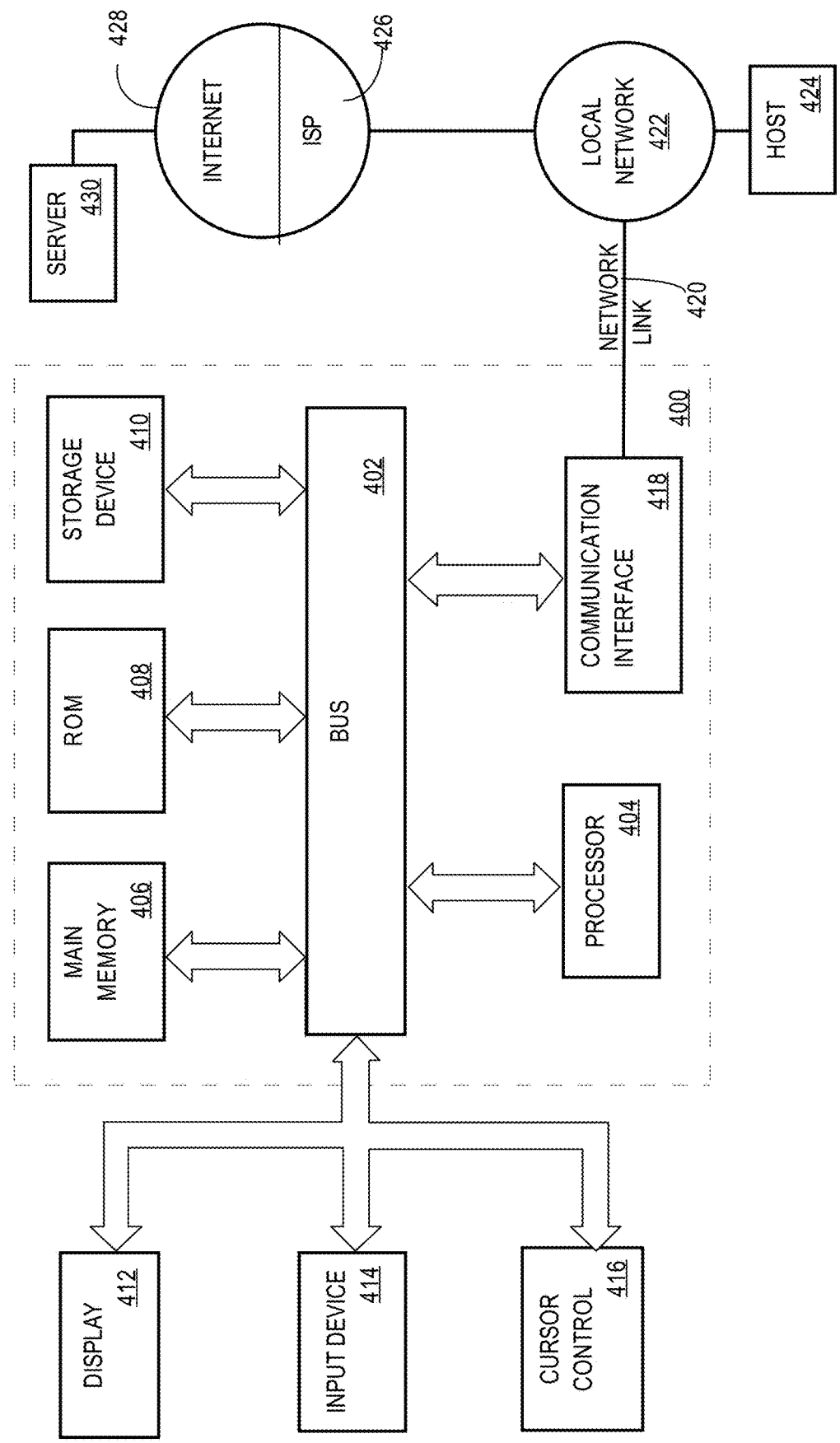
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
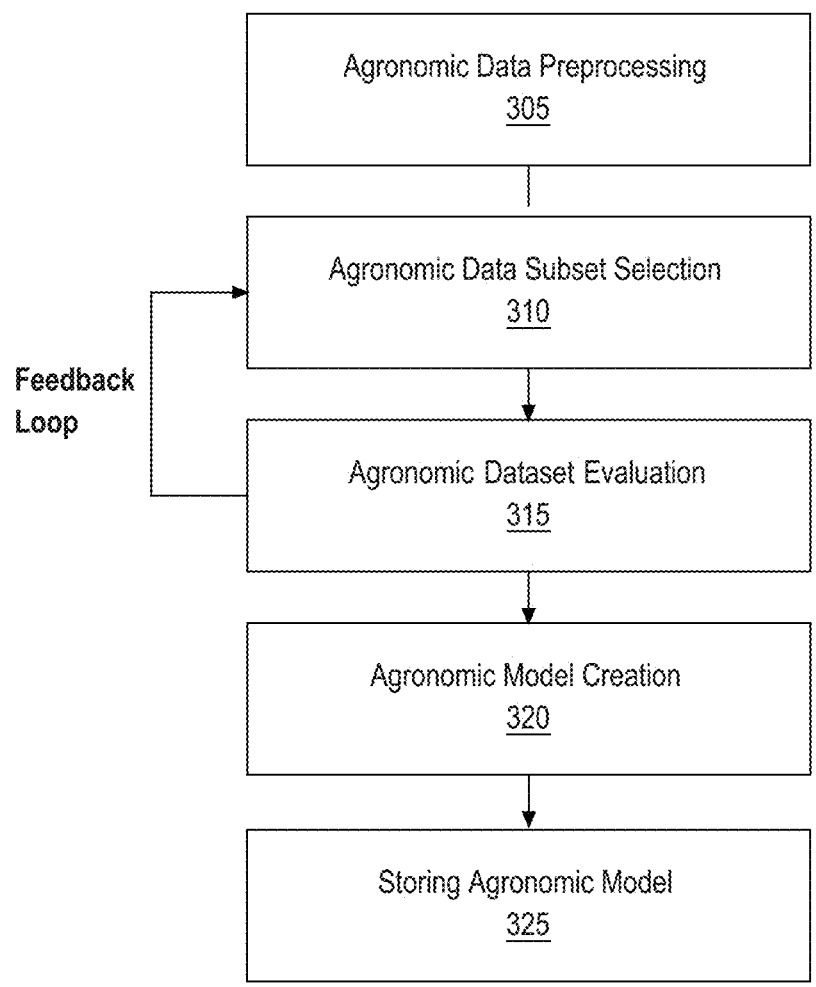
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Determining Risk of Disease

3.1. Received Data

Figure 7:
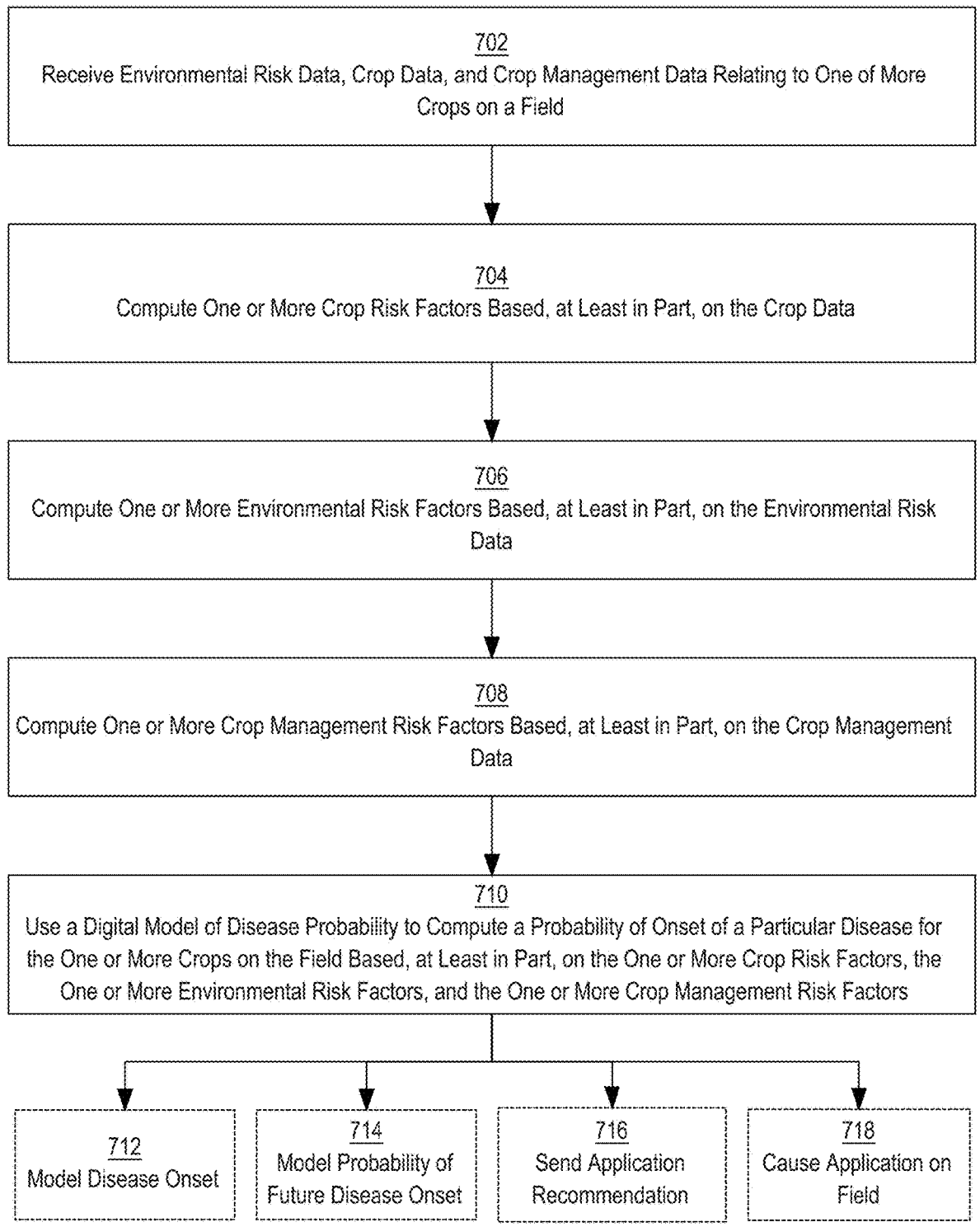
FIG. 7 depicts a method for determining a risk of disease of a crop on a field based on received data regarding the crop.

FIG. 7 depicts a method for determining a risk of disease of a crop on a field based on received data regarding the crop.

At step 702 environmental risk data, crop data, and crop management data relating to one or more crops on a field are received. For example, agricultural intelligence computer system 130 may receive data from the field manager computing devices 104 regarding the one or more fields. Additionally or alternatively, agricultural intelligence computer system 130 may receive information regarding the one or more fields associated with the field manager computing devices 104 from one or more remote sensors on or about the one or more fields, one or more satellites, one or more manned or unmanned aerial vehicles (MAVs or UAVs), one or more on-the-go sensors, and/or one or more external data servers 108. The data may include field descriptions, soil data, planting data, fertility data, harvest and yield data, crop protection data, pest and disease data, irrigation data, tiling data, imagery, weather data, and additional management data.

Environmental risk data may identify a risk of disease based on changes in the environment. Changes in the environment may include changes in temperature and humidity. The environmental risk data may indicate a number of risk hours and/or risk days that have accumulated between planting of a crop and a time or date of risk assessment. Risk hours and risk days, as used herein, refer to hours and days respectively where the crop is considered to be at risk of developing the disease based on environmental data. For instance, a risk hour may be identified if the temperature at the field is within a first range of values and the humidity at the field is within a second range of values. In an embodiment, environmental risk data includes time series data. The environmental risk data may indicate which hours between planting and a time of risk assessment were identified as risk hours. As an example, the environmental risk data may indicate that five hours on the day after planting were identified as risk hours, but only four hours in the next day were identified as risk hours.

Crop data may include data about the crop itself. For example, crop data may include identification of the type of hybrid seed that has been planted, one or more values indicating a tolerance of the seed to one or more types of diseases, and/or relative maturity rating of the seed. Crop management data may include data regarding management of the field. For example, crop management data may include identification of a number of days and/or growing degree days between planting of the crop and a time of risk assessment, prior planting and harvesting data, presence or absence of tillage on the field, and/or a type of tillage used on the field.

3.2. Factor Generation

At step 704, the process computes one or more crop risk factors based, at least in part, on the crop data. For example, agricultural intelligence computer system 130 may translate the received crop data into one or more factors which can then be used to calculate a risk of disease on the field. The crop risk factors may include factors based on the hybrid seed type and/or the relative maturity of the hybrid seed type.

Translating the identification of the type of hybrid seed planted to a crop risk factor may include accessing data which associates different hybrid seed types with a susceptibility value. For example, different hybrid seeds may be ranked based on susceptibility to different types of disease. The rankings may be based on previous field trials and/or published data of the seeds. The rankings may be normalized to values between −1 and 1 where a value of 1 indicates that the seed is the most susceptible to disease while a −1 indicates the seed is least susceptible to disease. In an embodiment, where the hybrid seed type is unknown, a seed type factor may be set to an average value. For example, where seed types are normalized to values between −1 and 1, an unknown seed type may be assigned a value of 0.

A relative maturity factor may include an integer of the relative maturity of the seed. Where data identifying a seed type is received, agricultural intelligence computer system 130 may determine a relative maturity based on the seed type. For example, agricultural intelligence computer system 130 may access data stored on agricultural intelligence computer system 130 or an external server computer which identifies relative maturity of different types of seeds. Agricultural intelligence computer system 130 may retrieve the relative maturity value for the seed type and use the relative maturity value as a relative maturity factor. Additionally or alternatively, the relative maturity factor may be a normalized version of the relative maturity integer value.

At step 706, the process computes one or more environmental risk factors based, at least in part, on the environmental risk data. For example, agricultural intelligence computer system 130 may compute one or more of a cumulative disease risk, an integral of the cumulative disease risk, a normalized cumulative disease risk, and/or a normalized integral of the cumulative disease risk.

The cumulative disease risk may be computed as a summation of risk hours and/or risk days up until a measurement day. For example, the cumulative disease risk for a day that is x days after planting of the crop may be computed as:

$$C(x) = \sum_{day=1}^{x} \text{risk}(day)$$

where C is the cumulative disease risk x days after planting of the crop and risk(day) is an environmental risk value for the day. The risk(day) value may be an accumulation of risk hours for the day and/or a value indicating whether the day was considered a risk day or not.

The integral of the cumulative disease risk may be computed as an accumulation of the cumulative disease risk for each day up until a measurement day. For example, the integral of the cumulative disease risk for a day that is x days after planting of the crop may be computed as:

$$I(x) = \sum_{day=1}^{x} C(day)$$

where I is the integral of the cumulative disease risk x days after planting of the crop and C(day) is the cumulative risk disease for the day. The integral of the cumulative disease risk values risk hours and/or risk days that occurred closer to planting over risk hours and/or risk days that occurred further from planting.

The normalized cumulative risk may be computed as the average daily disease risk whereas the normalized integral may be computed as a function of integral of cumulative disease risk and time. For instance, the normalized integral may be computed as the integral of cumulative disease risk divided by the integral of cumulative number of days after planting. As an example, the normalized cumulative disease risk and the normalized integral of the cumulative disease risk may be computed as follows:

$$C_n(x) = \frac{C(x)}{x}$$

$$I_n(x) = \frac{I(x)}{x(1+x)/2}$$

where $C_n(x)$ is the normalized cumulative disease risk x days after planting of the crop and $I_n(x)$ is the normalized integral of cumulative disease risk x days after planting of the crop.

At step 708, the process computes one or more crop management risk factors based, at least in part, on the crop management data. For example, agricultural intelligence computer system 130 may translate the crop management data into crop management factors using data stored in agricultural intelligence computer system 130. The identification of a number of days and/or growing degree days between planting of the crop and a time of risk assessment may be used in the environmental risk factor calculations described above and/or used as their own factor. Other management data, such as prior planting and harvesting data, presence or absence of tillage on the field, and/or a type of tillage used on the field may be translated into values indicating increase in risk or decrease in risk.

Agricultural intelligence computer system 130 may store data indicating increase or decrease in risk due to different management practices. For example, crop rotation may be identified as decreasing the risk of disease while an absence of crop rotation may be identified as increasing the risk of disease. Thus, crop rotation may be assigned a value of −1 while an absence of crop rotation is assigned a value of 1. Agricultural intelligence computer system 130 may assign a value of 0 when there is not enough prior planting data to determine if there has been crop rotation. Additionally or alternatively, agricultural intelligence computer system 130 may assign values for crop rotation between −1 and 1 based on a portion of the field that has received crop rotation. For example, if half of the field rotated crops, agricultural intelligence computer system 130 may assign a value of 0 where if three quarters of the field rotated crops, agricultural intelligence computer system 130 may assign a value of 0.5.

Presence or absence of tillage on the field may be treated similarly as presence and absence of crop rotation. For example, the presence of tillage may be assigned a value of −1 while the absence of tillage is assigned a value of 1. Agricultural intelligence computer system 130 may assign a value of 0 if there is no tillage information for the field. Additionally or alternatively, agricultural intelligence computer system 130 may assign values for the presence or absence of tillage between −1 and 1 based on a portion of the field that has received tillage.

For harvesting data and type of tillage, agricultural intelligence computer system 130 may assign values to different types of harvesting and different types of tillage based on the amount that the harvesting type and/or tillage type affects the risk of disease. For example, conventional tillage which tends to bury a large amount of residue may be assigned a value closer to −1 while minimal tillage may be assigned a value closer to 1. Other types of tillage may be assigned a range of numbers based on how well they bury residue or decrease risk of disease in the field. Harvest types may be treated similarly, where harvest types that remove a larger amount of residue are assigned values closer to −1 while harvest types that leave behind a larger amount of residue are assigned values closer to 1.

Irrigation and fungicide factors additionally may be generated by agricultural intelligence computer system 130 based on irrigation and fungicide data. For example, agricultural intelligence computer system 130 may receive data identifying a date/time of fungicide application, an amount of fungicide applied, and an area of the field to which the fungicide was applied. For a given day, the fungicide factor may be based on a number of days since the last fungicide application an amount of fungicide applied, and/or an area of the field to which the fungicide was applied. For example, a fungicide factor may be computed as:

$$f=1-2(A-t)$$

where f is the fungicide factor, A is the percentage of the field to which fungicide was applied, and t is a time value which equals 0 on the date of fungicide application and approaches one as the number of days since application approaches a particular value. For example, if a fungicide is assumed to be no longer effective after thirty days, then t may approach 1 as the number of days since the application approaches thirty. A second factor for a type of fungicide may be used which approaches −1 for stronger fungicides and approaches 0 for weaker fungicides.

A similar equation may be used for irrigation which increases the moisture and thereby additionally increases a likelihood of higher humidity. The irrigation factor may additionally comprise a value which approaches one the closer to a time of irrigation and approaches negative one the further the crop is from irrigation. In embodiments where agricultural intelligence computer system 130 receives soil moisture data, agricultural intelligence computer system 130 may associate higher soil moistures with values closer to 1 and lower soil moistures with values closer to −1. As a result of completing steps 702 to 708, the server computer is able to model a probability of disease onset using a plurality of different factors based on received data.

3.3. Digital Disease Modeling

At step 710, the process uses a digital model of disease probability to compute a probability of onset of a particular disease for the one or more crops on the field based, at least in part, on the one or more crop risk factors, the one or more environmental risk factors, and the one or more crop management risk factors. The crop risk factors may include one or more of a seed type factor or a relative maturity of the seed. The environmental risk factors may include one or more of the cumulative environmental risk, the integral of the cumulative environmental risk, the normalized cumulative environmental risk, or the normalized integral of the cumulative environmental risk, and/or other computations of environmental risk based on environmental conditions favorable to disease. The crop management risk factors may include one or more of the crop rotation factors, the presence or absence of tillage factor, the harvesting data factor, the tillage type factor, the fungicide factor, the irrigation factor, or the soil moisture factor.

In an embodiment, agricultural intelligence computer system 130 trains a model of disease probability using training data comprising one or more risk factors as inputs and a presence or absence of disease as outputs. For example, agricultural intelligence computer system 130 may train a model based on reports of diseases identified on a field, such as northern leaf blight and gray leaf spot. Agricultural intelligence computer system 130 may receive a plurality of training datasets, each of which identifying a state of one or more factors as well as whether the crop was observed with the disease or without the disease. For example, a first training dataset may indicate the following:

presence of disease=y
days after planting=87
crop rotation=no
tillage=yes
tillage type=minimal till
risk hours per day={3, 5, . . . , 0}
fungicide application=no
irrigation=no
relative maturity=93
hybrid risk level=5 where the hybrid risk level is an estimated risk for a particular type of hybrid seed. The hybrid risk level may be received from one or more external servers based on the hybrid seed type and/or determined at agricultural intelligence computer system 130 based on the hybrid seed type. Agricultural intelligence computer system 130 may convert the data in the training dataset to factors as described above and use the factors to train a digital model of disease probability.

In an embodiment, agricultural intelligence computer system 130 trains models of disease probability for different geographic locations. For example, agricultural intelligence computer system 130 may receive, with the training datasets, data identifying a location of the field, such as latitude and longitude. Agricultural intelligence computer system 130 may select a range of latitudes and/or longitudes and train a model of disease probability with only training datasets associated with locations within the range of latitudes and/or longitudes. The trained model of disease probability based on datasets within the range of latitudes and/or longitudes may be used to compute a probability of disease risk for one or more locations with a latitude and longitude within the range of latitudes and/or longitudes. Additionally or alternatively, latitude and/or longitude may be used as an input factor in the model of disease probability.

In an embodiment, the model of disease probability uses a plurality of randomly generated decision trees to determine a likelihood of onset of a particular disease. For example, the model of disease probability may comprise a random forest classifier which accepts inputs of the one or more factors described herein and outputs a likelihood of onset of a disease for a crop on a given day. Code for implementing a random forest classifier is readily available on public open source program code repository systems, such as GITHUB. The random forest classifier may be used to model the probability of the presence of disease for a plurality of days for a particular field.

In an embodiment, the model of disease probability computes the probability of disease onset over time. For example, a survival regression model, such as the Cox Proportional Hazard model, may be trained using one or more of the above described factors as covariates. As a survival regression model computes the probability of disease onset over time, environmental risk hours and/or risk days may be used as a duration variable for the model. Additionally or alternatively, agricultural intelligence computer system 130 may use growing degree days as the duration variable. When the model is run for a particular field, data may be aggregated to identify a particular time of onset. For example, if the output of a Cox Proportional Hazard model identifies a high risk of disease after a given day, agricultural intelligence computer system 130 may select the given day as the likely onset of the disease.

3.4. Data Usage

The techniques described thus far may be implemented by computer to provide improvements in another technology, for example plant pathology, plant pest control, agriculture, or agricultural management. For example, at step 712, the process may model the onset of a disease on a crop. At step 714, the process may model the probability of future disease onset. At step 716, the process may send application recommendations to a field manager computing device. At step 718, the process may cause application of a product, such as a fungicide, on a field. The agricultural computer system may perform one or more of steps 712-718. Each of the processes described in steps 712-718 are described further herein.

In an embodiment, agricultural intelligence computer system 130 uses the probabilities of disease to determine if a particular disease is currently affecting a field or has affected a field. For example, agricultural intelligence computer system 130 may receive crop data, management data, and environmental risk data for a particular field from one or more sources such as a field manager computing device or an external server computer. Agricultural intelligence computer system 130 may use the disease probability to model the likelihood of disease occurring each day since planting. For example, agricultural intelligence computer system 130 may use the random forest model using different datasets depending on the day or the Cox Proportional Hazard model to determine whether disease is likely to have appeared and when the disease appeared.

In an embodiment, the probabilities of disease are used to update models of crop yield and/or reduce a prior estimate of crop yield. For example, agricultural intelligence computer system 130 may use prior computations of crop yield and prior identifications of disease to determine an effect on crop yield of a particular disease. Based on the determination that the particular disease is currently affecting the field or has affected the field, agricultural intelligence computer system 130 may adjust the crop yield for the crop using the determined effect on crop yield of the particular disease. The reduced yield value may be sent to a field manager computing device for display to a field manager or may be used to recommend fungicide use and/or fungicide trials for future years.

In an embodiment, agricultural intelligence computer system 130 uses the model of disease probability to determine a future likelihood of the presence of a disease on the crop. For example, agricultural intelligence computer system 130 may use fourteen-day weather forecasts to determine likely risk hours or risk days into the future. Using the likely risk hours or risk days into the future, agricultural intelligence computer system 130 may compute estimated environmental risk factors for the future. Agricultural intelligence computer system 130 may then use the one or more crop risk factors, the one or more crop management risk factors, and the estimated environmental risk factors to compute likelihood of disease onset in the next fourteen days.

Agricultural intelligence computer system 130 may use the computed likelihood of presence of a disease to generate fungicide recommendations. For example, agricultural intelligence computer system 130 may determine a likelihood of onset of the disease on the crop in the next fourteen days using the methods described herein. Agricultural intelligence computer system 130 may additionally determine a benefit of applying the fungicide. The benefit may comprise reducing the likelihood of disease onset and/or increasing the likely yield for the crop. If agricultural intelligence computer system 130 determines that the disease is likely to present on the crop within the next fourteen days, agricultural intelligence computer system 130 may generate a recommendation to apply fungicide to the crop, thereby reducing the probability of disease. By modeling the likelihood of disease occurring in the future, agricultural intelligence computer system 130 is able to generate recommendations that, if implemented, prevent the occurrence or spread of the disease.

In an embodiment, the fungicide recommendations are sent to a field manager computing device. For example, agricultural intelligence computer system 130 may cause a notification to be displayed on the field manager computing device identifying one or more fields and/or one or more portions of the field that are likely to present with a particular disease, thereby giving the field manager the opportunity to prevent or limit the progression of the disease. The fungicide recommendation may identify a likely benefit to the field of applying the fungicide. For example, agricultural intelligence computer system 130 may compute an estimate of yield loss if disease presents. Based on the estimate of loss, agricultural intelligence computer system 130 may determine a benefit to crop yield and/or revenue of applying the fungicide. The fungicide recommendation may identify the likely increase in crop yield and/or revenue for applying the fungicide.

Additionally or alternatively, agricultural intelligence computer system 130 may cause implementation of the fungicide recommendation on one or more fields. For example, agricultural intelligence computer system 130 may generate a script which, when executed by an application controller, causes the application controller to control a field implement which releases fungicide onto a field. Thus, agricultural intelligence computer system 130 may determine whether a disease is likely to present within a particular period of time and, in response, cause prevention of the disease through application of a fungicide.

In an embodiment, agricultural intelligence computer system 130 continuously monitors values for a particular field in order to determine when to apply a fungicide. For example, if agricultural intelligence computer system 130 has access to fourteen-day forecasts, agricultural intelligence computer system 130 may periodically compute a likelihood of a disease presenting within fourteen days of the computation. Thus, as the growing season progresses, agricultural intelligence computer system 130 may track the likelihood of disease presenting on the field and generate fungicide recommendations as the likelihood increases. For instance, agricultural intelligence computer system 130 may do new computations every seven days using fourteen-day forecasts. When agricultural intelligence computer system 130 detects likely occurrence of the disease in a computation, agricultural intelligence computer system 130 may generate a fungicide recommendation.

In an embodiment, agricultural intelligence computer system 130 uses the computations of disease risk to recommend different actions for the field manager for upcoming seasons. For example, if agricultural intelligence computer system 130 determines that disease presented on the field, agricultural intelligence computer system 130 may compute likelihood that disease would have presented given a different type of tillage, different type of hybrid seed planted, different type of harvesting, crop rotation, or one or more other different management practices using the methods described herein. For instance, if minimal tillage was initially used, agricultural intelligence computer system 130 may compute the likelihood that disease presented if conventional tillage was used. If agricultural intelligence computer system 130 determines that changing the tillage type would likely have caused the disease to not present and/or reduced the amount of fungicide needed to keep the disease from presenting, agricultural intelligence computer system 130 may recommend changing the tillage type for future seasons.

4. Benefits of Certain Embodiments

Numerous benefits and improvements provided by the techniques herein have been described in the preceding section. Furthermore, using the techniques described herein, a computing device can track the risk of a disease affecting crops on a field. Agricultural intelligence computer system 130 may then act on that risk by either providing a field manager computing device with a recommendation for avoiding damage to the crop based on the risk and/or by controlling an implement on the field and causing the implement to release fungicide onto the field. By doing so, agricultural intelligence computer system 130 provides data which can be used to protect crops, increase crop yield, and generate stronger digital models of the crop during development.

5. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A computer system comprising:
one or more processors;
a memory storing instructions which, when executed by the one or more processors, cause performance of:
receiving environmental risk data, crop data, and crop management data relating to one or more crops on a field;
computing one or more crop risk factors based, at least in part, on the crop data;
computing one or more environmental risk factors based, at least in part, on the environmental risk data, the environmental risk factors comprising a cumulative disease risk and an integral of the cumulative disease risk;

computing one or more crop management risk factors based, at least in part, on the crop management data;

using a digital model of disease probability, computing a probability of onset of a particular disease for the one or more crops on the field based, at least in part, on the one or more crop risk factors, the one or more environmental risk factors, and the one or more crop management risk factors, the digital model of disease probability having been trained using a training dataset comprising at least crop risk factors, environmental risk factors comprising the cumulative disease risk and the integral of the cumulative disease risk, management risk factors, and occurrence or non-occurrence of disease, wherein the crop risk factors, environmental risk factors, and management risk factors are used as training inputs and occurrence or non-occurrence of disease is used as training outputs;

based, at least in part, on the on the probability of onset of the particular disease, sending, to an application controller, one or more scripts, wherein the one or more scripts are executed by the application controller to cause the application controller to cause an implement on the field to release fungicide on one or more portions of the field.

2. The system of claim 1, wherein the instructions, when executed by the one or more processors, further cause performance of:

using the probability of onset of the particular disease for the one or more crops on the field, determining a benefit of applying a fungicide to the field;

sending, to a field manager computing device, a fungicide recommendation identifying the benefit of applying the fungicide to the field.

3. The system of claim 1, wherein the digital model of disease probability comprises a random forest model.

4. The system of claim 1, wherein the digital model of disease probability comprises a survival regression model.

5. The system of claim 1, wherein the one or more crop management risk factors include a first factor indicating a number of days after the crop has been planted, a second factor based on occurrence or non-occurrence of crop rotation, and a third factor based on tillage type.

6. The system of claim 1, wherein the one or more crop risk factors include a first factor identifying a relative maturity of the crop and a second factor identifying a tolerance of a seed of the crop.

7. The system of claim 1, wherein the instructions, when executed by the one or more processors, further comprise:

receiving soil moisture data indicating soil moisture for the field;

computing a soil moisture factor from the soil moisture data;

performing computing the probability of onset of the particular disease for the one or more crops on the field based, at least in part, on the soil moisture factor.

8. A method comprising:

receiving environmental risk data, crop data, and crop management data relating to one or more crops on a field;

computing one or more crop risk factors based, at least in part, on the crop data;

computing one or more environmental risk factors based, at least in part, on the environmental risk data, the environmental risk factors comprising a cumulative disease risk and an integral of the cumulative disease risk;

computing one or more crop management risk factors based, at least in part, on the crop management data;

using a digital model of disease probability, computing a probability of onset of a particular disease for the one or more crops on the field based, at least in part, on the one or more crop risk factors, the one or more environmental risk factors, and the one or more crop management risk factors, the digital model of disease probability having been trained using a training dataset comprising at least crop risk factors, environmental risk factors comprising the cumulative disease risk and the integral of the cumulative disease risk, management risk factors, and occurrence or non-occurrence of disease, wherein the crop risk factors, environmental risk factors, and management risk factors are used as training inputs and occurrence or non-occurrence of disease is used as training outputs;

based, at least in part, on the on the probability of onset of the particular disease, sending, to an application controller, one or more scripts, wherein the one or more scripts are executed by the application controller to cause the application controller to cause an implement on the field to release fungicide on one or more portions of the field.

9. The method of claim 8, further comprising:

using the probability of onset of the particular disease for the one or more crops on the field, determining a benefit of applying a fungicide to the field;

sending, to a field manager computing device, a fungicide recommendation identifying the benefit of applying the fungicide to the field.

10. The method of claim 8, wherein the digital model of disease probability comprises a random forest model.

11. The method of claim 8, wherein the digital model of disease probability comprises a survival regression model.

12. The method of claim 8, wherein the one or more crop management risk factors include a first factor indicating a number of days after the crop has been planted, a second factor based on occurrence or non-occurrence of crop rotation, and a third factor based on tillage type.

13. The method of claim 8, wherein the one or more crop risk factors include a first factor identifying a relative maturity of the crop and a second factor identifying a disease tolerance of a seed of the crop.

14. The method of claim 8, wherein the instructions, when executed by the one or more processors, further comprise:

receiving soil moisture data indicating soil moisture for the field;

computing a soil moisture factor from the soil moisture data;

performing computing the probability of onset of the particular disease for the one or more crops on the field based, at least in part, on the soil moisture factor.

* * * * *